July 3, 1934.  G. A. CUTTER  1,965,521
METHOD OF AND APPARATUS FOR ELECTRIC WELDING
Filed March 12, 1931  3 Sheets-Sheet 1

Inventor:
George A. Cutter

July 3, 1934.  G. A. CUTTER  1,965,521
METHOD OF AND APPARATUS FOR ELECTRIC WELDING
Filed March 12, 1931  3 Sheets-Sheet 2
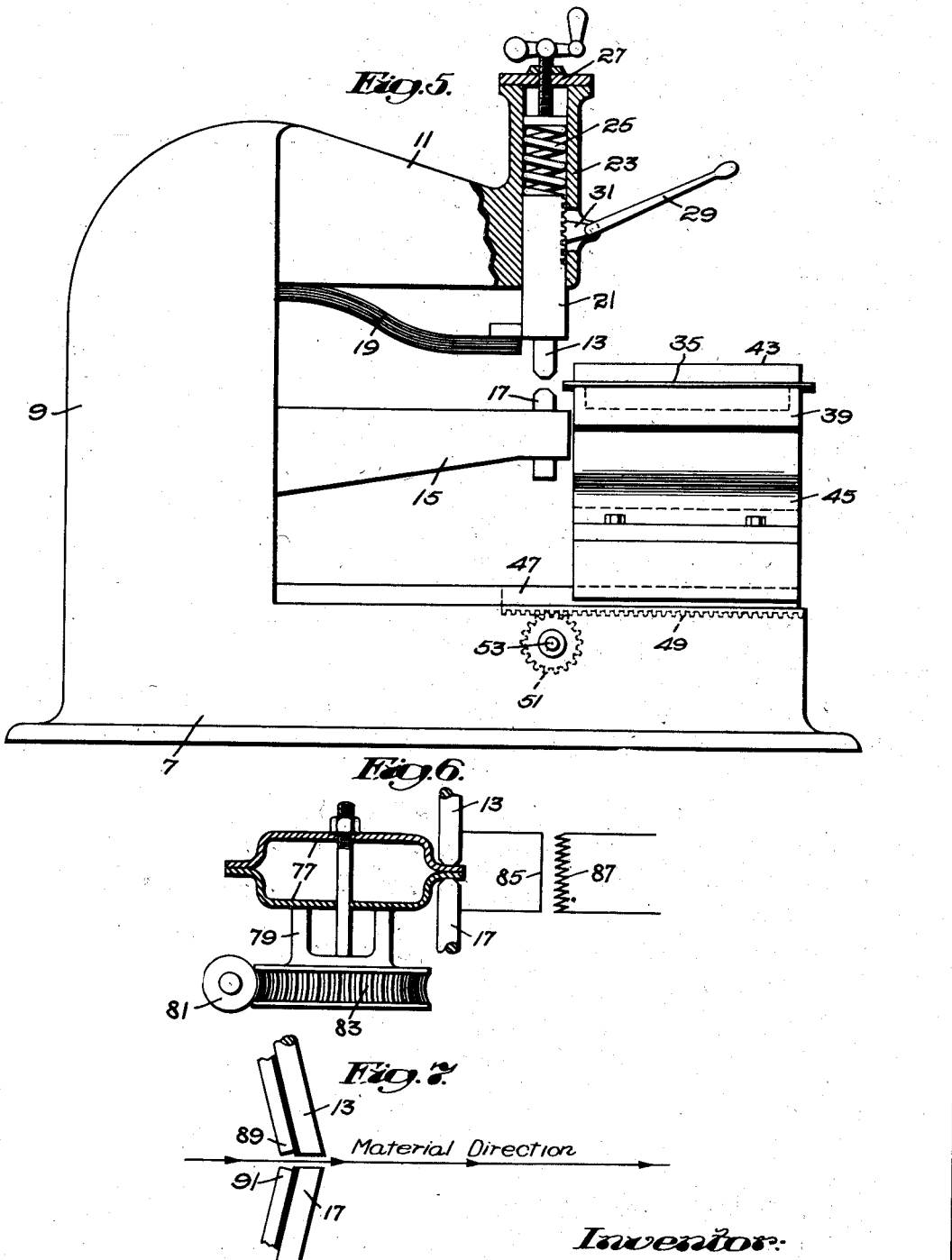

July 3, 1934. G. A. CUTTER 1,965,521
METHOD OF AND APPARATUS FOR ELECTRIC WELDING
Filed March 12, 1931 3 Sheets-Sheet 3
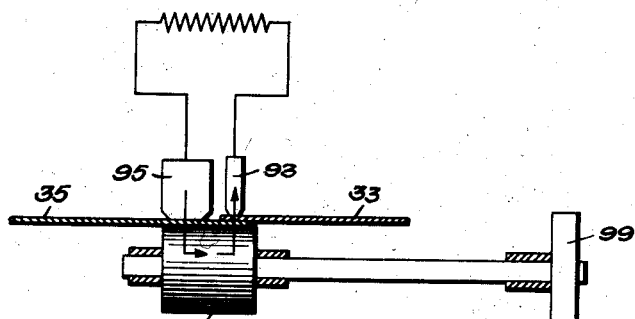
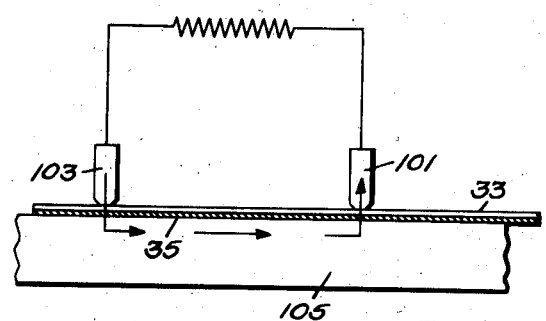
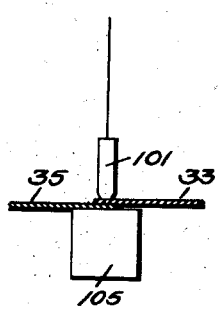
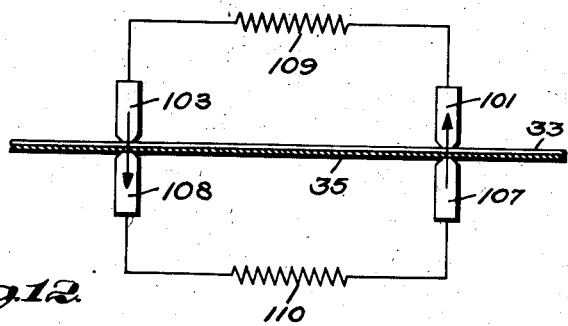
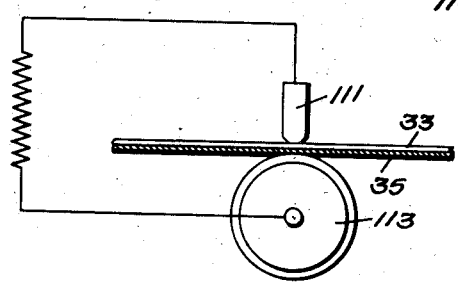
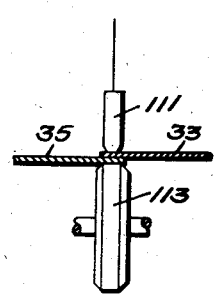
Inventor:
George A. Cutter Patented July 3, 1934

1,965,521

UNITED STATES PATENT OFFICE 1,965,521

METHOD OF AND APPARATUS FOR ELECTRIC WELDING

George A. Cutter, Dedham, Mass., assignor to Thomson-Gibb Electric Welding Company, Lynn, Mass., a corporation of Massachusetts Application March 12, 1931, Serial No. 521,928

23 Claims. (Cl. 219—4)

This invention relates to methods of and apparatus for lap seam welding, and comprises more particularly a simplified and improved method of electric resistance welding applicable to the welding of the overlapped edges of metal sheets or other metal bodies.

Lap seam welding, as it is commonly carried out, is effected by moving the work relatively between roller electrodes which press between them the overlapped edges of the work pieces to be welded or between one roller electrode and an electrode bar or anvil on which the work rests without relative movement thereover, and, by rolling contact with the surface of the work, complete the secondary circuit through the intervening lap, heating it to a welding heat and, by the pressure of the electrodes, completing the weld.

This method of lap seam welding is open to certain objections. Since the roller is a part of the secondary circuit it must be of low resistance to avoid heating. The transmission of current from the fixed part of the circuit to the roller or rotating member thereof necessitates a sliding contact which, together with difficulties of lubrication, involves both mechanical and electrical complications. The result has been that in practical welding machines of this type, roller electrodes with their associated mountings and attachments have been expensive to construct and to maintain. They have also necessarily been of large and bulky structure, which precludes their use in many kinds of work, such as seam welding close to outwardly projecting walls or parts of a work piece where insufficient clearance is left for the application of the bulky rollers. In the case of roller electrodes also, the contact which takes place between the electrodes and the work is restricted substantially to the line contact taking place between the electrodes and the surface of this work.

The present invention contemplates so disposing one or both of the electrodes which bear against the lap that on relative movement between the work and the electrodes an intimate, frictional, sliding contact is had between them, the pressure of the electrode against the work being sufficient to complete the weld thereat, producing what may be appropriately termed slip, lap-seam welding. This avoids the necessity of the rolling contact characteristic of roller electrodes. The electrode may therefore be made in simple bar, rod, strip, plate or other form suitable to apply the required pressure, avoiding the mechanical and electrical difficulties and the bulky structure incidental to the use of a roller, permitting the electrodes to be so shaped as to be capable of application to a much wider range and variety of work, reducing the initial cost and subsequent up-keep, and at the same time permitting a contact between the electrode and the work not limited to a line contact but of any desired longitudinal extent and area.

The invention will be best understood by reference to the following description when taken in connection with the accompanying illustration of one specific embodiment thereof, while its scope will be more particularly pointed out in the appended claims.

In the drawings:

Fig. 5 is a side elevation, partly in section, of the machine shown in Fig. 1;

Fig. 6 is a fragmentary and partly diagrammatic view showing a further modification;

Fig. 7 is a detail showing a method of relating the electrodes to the work;

Fig. 8 illustrates another relative disposition of the electrodes;

Figs. 9 and 10 illustrate, in side and end elevations, respectively, another electrode arrangement;

Fig. 11 illustrates still another electrode disposition; and

Figs. 12 and 13 show, in side and end elevations, respectively, a further modification.

Figure 1:
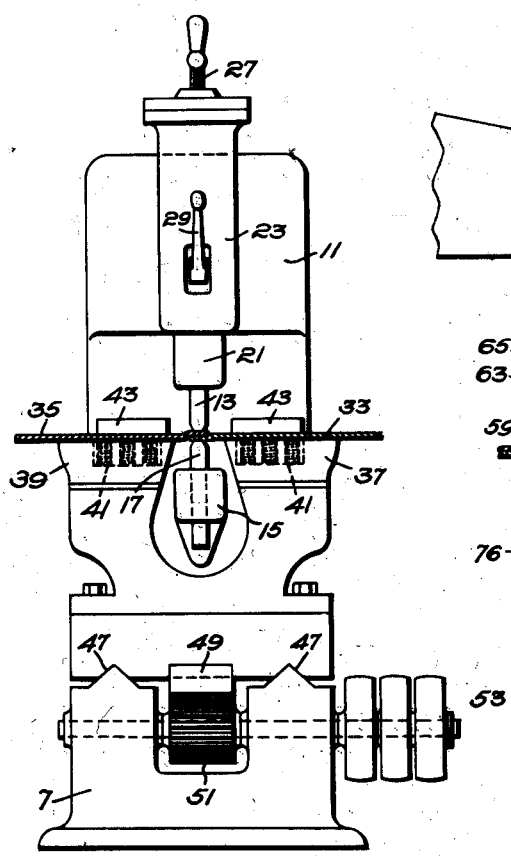
Fig. 1 is a front elevation of a welding machine embodying one form of the invention.

Referring to the drawings and first to the embodiment of the invention shown in Figs. 1 and 5, the machine is provided with a base 7 having at one end the upright standard or pillar 9, from the upper end of which projects the forwardly extending arm 11 designed to overlie the work and to carry the vertically movable electrode 13 in suitable relation to the work. Extending in parallel, spaced relation beneath the arm 11 is a supporting arm 15 adapted to underlie the work and support the stationary electrode 17. While the latter is herein of a shape similar to that of the movable electrode 13, presenting a relatively small area of contact to the overlying work piece, it may, if desired, present a contact surface of much greater area, such, for example, as would be provided by a conductive anvil or horn extending a substantial distance lengthwise the arm 15. The electrodes may be of any desired shape or size suited to the work to be welded so long as they provide the requisite structural firmness to apply a pressure to the work when heated by the secondary current sufficient to compress the heated metal and complete the weld.

The usual insulation is provided between the electrodes and the framework of the machine, the lower electrode being connected by connections, not herein shown, to one terminal of a transformer secondary (not shown) mounted in the standard 9, and the upper electrode 13 being connected to the opposite terminal of the transformer secondary by a flexible copper connection 19.

In the operation of the machine, the upper electrode 13 is forced down under suitable pressure against the upper surface of one of the two overlapping edges of a work piece, the under surface of the overlapping edge of the companion piece being thereby pressed against the lower electrode 17. To effect the required vertical movement of the upper electrode, any of the usual devices for this purpose may be employed, actuated either mechanically or by fluid pressure. Herein, for illustrative purposes, the electrode 13 is carried by a vertical, movable head 21 guided in the upright barrel 23 carried by the end of the arm 11, the head with its connected electrode being forced down under the pressure of the spring 25, the pressure of which may be adjusted by the adjusting screw 27. When it is necessary to raise the electrode for the insertion or withdrawal of the work, the lever arm 29 is depressed which, acting through the segmental gear 31 engaging with the rack teeth on the head 21, serves to raise the head and the electrode.

In Figs. 1 and 5 the machine is shown as adapted to the lap seam welding of two work pieces comprising two substantially flat sheets of metal 33 and 35. These are placed upon the flat top of a table or carrier with their edges in overlapping relation and aligned with the two electrodes. The sheet 33 is placed upon the carrier 37 and the sheet 35 upon the carrier 39 and are held clamped thereon in fixed relation by any suitable means, such as the magnetic chucks 41 provided each with its keeper 43, serving to hold the two plates in fixed and rigid relation. The form of the work carriers may be varied to suit the character of the work and the shape of the work pieces. The two carriers 37 and 39 are mounted upon a carriage 45 which has two upwardly extending, bifurcated or longitudinally spaced extensions (Fig. 1) so that the carriage is capable of movement lengthwise the machine without interference with the supporting arm 15. The work carriers 37 and 39 are preferably insulated from the main body of the carriage. The carriage is mounted so as to be capable of lengthwise reciprocation, being herein shown as supported upon longitudinal guides 47 and provided with a rack 49 engaging the driving pinion 51. The latter is secured to the shaft 53 which is provided with any suitable mechanism for moving the carriage from the right to the left as viewed in Fig. 5, for stopping its movement and for reversing it to bring it back to its original position. Any usual mechanism for this purpose may be employed, such as a system of tight and loose pulleys, with crossed and open driving belts.

In the operation of the machine, the work pieces having been clamped in the work carriers as described and the upper electrodes 13 raised to permit the advance of the carriage and the insertion of the overlapping edges of the two work pieces between the two electrodes, the upper electrode is then depressed, being forced against the upper overlapping edge under the pressure of the spring 25, the current is then turned on and the forward feeding movement of the carriage simultaneously started. This causes the overlapping edges of the two work pieces to be moved relatively to the electrodes, the work being forced between the contacting surfaces of the lower and upper electrodes with a sliding frictional engagement therewith. The current passes from one electrode to the other through the lapped metal, and the combined pressure of the electrodes and heat caused by the flow of the current produces the weld. After the entire length of the seam has been traversed by the electrodes the current is cut off, the upper electrode raised and the movement of the carriage reversed, bringing it back to its initial position, after which the welded work is removed from the carriage.

Figure 2:
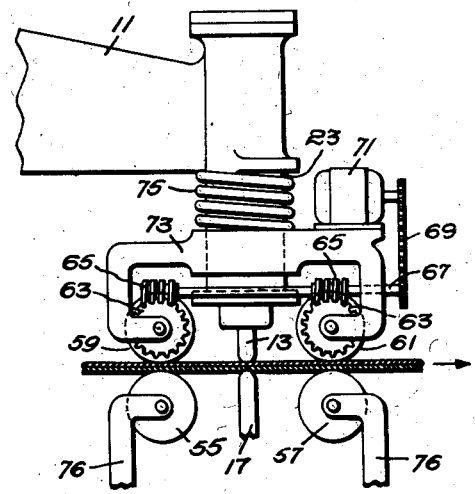
Fig. 2 shows a modification of the machine shown in Fig. 1.

In Fig. 2 there is shown a modified form of the invention in which the relative movement between the work pieces and the electrodes is caused to take place by means of feed rollers instead of a traveling carriage, whereby work pieces or sheets of indefinite length may be welded by this process. The arrangement is also such that the travel of the work pieces with relation to the electrodes may take place in any desired direction, either longitudinally or transversely the machine, or in any intermediate direction. For this purpose there is provided on the entering side of the electrodes, or that from which the work is advanced, a pair of guide rollers 55 on which the work pieces rest, one roller of the pair engaging each sheet close to the seam. In Fig. 2 only one roller of the pair appears. At the opposite side of the electrodes, or at the side where the work emerges from the electrodes, there is provided a similar pair of guide rollers 57. Immediately above each one of the four rollers 55 and 57 and adapted to press down upon the tops of the respective sheets, there are provided pairs of feeding rollers 59 and 61 which are positively driven and, engaging the tops of the sheets under pressure, are adapted to feed the work between the electrodes in the same manner and with substantially the same result as if the feed of the work were effected through the traveling carriage 45 in the machine shown in Figs. 1 and 5. The feed rollers may be driven by any suitable means but herein the respective shafts are provided with a worm gear 63 engaged by the worm 65 mounted on the shaft 67 and driven by chain and sprocket gearing 69 from the motor 71, the latter being mounted on the carriage 73 which provides a journaling support for the feed rollers 59 and 61.

The carriage 73 is slidably mounted on the outside of the barrel 23 and forced downwardly under the pressure of the spring 75 and is so supported on the barrel that it may be adjusted thereabouts at different angular positions to provide for the feed of the work in different directions with relation to the bed of the machine. The guide rollers 55 and 57 are also mounted upon a support which, by means not herein shown, may be cooperatively adjusted when the angular position of the carriage 73 is thus altered.

Figure 3:
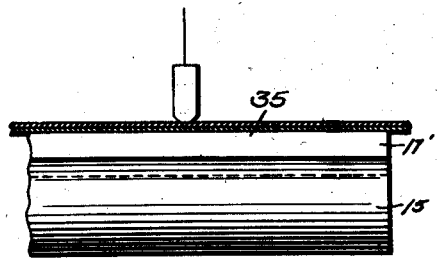
Figs. 3 and 4 are diagrammatic side and end elevations, respectively, illustrating a further modification of the machine shown in Fig. 1.
Figure 4:
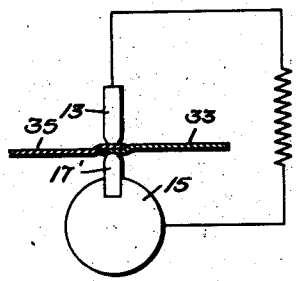

In Figs. 3 and 4 there is diagrammatically illustrated the arrangement previously referred to wherein the lower electrode is in the form of an elongated bar 17' held in a stationary arm or support 15' extending longitudinally the machine beneath the work, the electrodes 17' forming an elongated anvil or rest underlying the work for the whole or a substantial part of the length of the seam.

A similar method of welding may be employed where the lap seam to be welded is other than straight line in form, as, for example, where it is desired to lap weld a circular seam, such as is shown in Fig. 6. This method of lap welding is here shown as applied to the welding of the overlapping flanged edges of two disc-shaped pieces 77. These are mounted and held in fixed relation one to the other by any suitable means upon a support 79. The latter is so related to the upper and lower electrodes 13 and 17 that when rotated by the worm 81 engaging the worm gear 83 on the support the lapped parts of the work pieces are carried frictionally between the electrodes, the weld being completed when the support has performed one complete rotation. The electrodes herein, as in the modifications heretofore described, are pressed toward each other and are connected to the secondary 85 of a transformer, the primary of which is shown at 87.

It will be observed that in each of the different modifications of the invention herein shown, the work is moved with relation to the electrodes which are forcibly pressed against the opposite sides of the lap, so that the contacting surfaces of the electrodes are caused to pass in sliding frictional contact over the work. It is obvious that, instead of causing the work to be moved past the stationary electrodes, the work itself might be held stationary and the electrodes caused to pass frictionally over the work.

This method of welding additionally assists in maintaining a clean welded seam and provides a close and effective welding contact with the electrodes, since the frictional contact of the latter tends to clear the metal of oxidized particles and of the finely divided metal which tend to form at the surface through which the welding current passes.

To further assist in this action, the electrodes may be given a slight inclination from the material toward their points of support in the opposite direction to that in which the material is advanced, such as in shown diagrammatically in Fig. 7, and with each electrode there may be cooperatively related a clearing tool with intervening insulation, such as is shown at 89 and 91, the tool being designed to bear against the material with the electrode in advance of its engagement by the electrode and by a frictional, scraping or rubbing movement to clear the surface of the work from oxide and other loose particles likely to interfere with a good electrical contact between the electrodes and the metal.

In Fig. 8 another disposition of the electrodes is illustrated in which the electrode 93 bears forcibly against the lap, the companion electrode 95 having a relatively large substantial area of contact being independently pressed against the underlying work piece at the same side of the work and in the same direction but in close relation to the lap. The work is here pressed between the electrodes and an underlying roller 97, which latter may be driven by any suitable means, as by the belt-driven driving pulley 99, to cause relative movement between the work and the electrodes or the roller may be a freely rotating roller and the work moved by some external agency, such as the feed carriage 45 shown in Fig. 1.

The roller 97, or the surface thereof, is preferably of conductive metal, thereby tending to direct the heating current along the path indicated, from one electrode through the work into the body of the roller, and thence to the companion electrode through the lap. In this arrangement of the two electrodes, there may be substituted for the roller a stationary conductive bar or anvil on which the work rests and between which and the electrodes the work is moved by external means, such as the feed carriage 45, or the work may rest on such bar without relative movement thereon and the relative movement between the electrodes and the work secured by moving the electrodes over the work or the bar and work under the electrodes.

In Figs. 9 and 10, electrodes 101 and 103 both bear forcibly against the same side of the lap but are separated by a substantial distance, the work resting on a copper bar 105 extending beneath the lap and for a distance at least equal to or greater than the spacing of the electrodes. This arrangement is such that the heating current tends to take the path indicated, passing from one electrode through the work, into the underlying conductive rest, and thence to a point beneath the companion electrode and through the work into said companion electrode. The work being moved relatively to the electrodes and lengthwise the bar 105, the lap is heated and the work welded by sliding frictional contact of the electrodes pressed thereagainst in the manner heretofore described.

In Fig. 11 there is shown an arrangement in which the electrodes 101 and 103, separated as in Fig. 9, are opposed by similar electrodes 107 and 108 applied to the opposite side of the lap. The electrodes 101 and 103 form part of a circuit which includes the transformer secondary 109 and the electrodes 107 and 108 form part of a circuit which includes the transformer secondary 110 which is in step-up or reinforcing relation to the secondary 109. The heating current tends to pass from the electrode 103 through the lap to electrode 108, thence to the electrode 107 and again through the lap to the electrode 101, the pressure of the electrodes 101 and 103 relatively toward the stationary electrodes 107 and 107 completing the weld.

In both constructions shown in Figs. 10 and 11, the electrodes are separated by a sufficient distance to minimize the tendency of the current to pass directly from electrode 101 to electrode 103 through the work piece with which they contact.

In Figs. 12 and 13 a further modification of the invention is shown, wherein the work is pressed between an electrode 111 of the frictional sliding contact type and a second electrode 113 of the roller type, thus securing in part certain advantages of the invention, in that the electrode 111 may be constructed to penetrate or enter areas of the work which could not be reached by a roller.

Electrodes of the frictional sliding contact type when used for lap seam welding have marked advantages over electrodes of the roller type in respect to cost and up-keep, particularly since they may be constructed of relatively inexpensive strip copper and may be installed in the welding machine in lengths of substantial amount, so that, as they wear under continued usage, the strip or length may be fed or advanced in the carrier. On the other hand, roller electrodes are highly expensive to construct and require to be frequently dressed and renewed, with substantial expense incidental to their up-keep.

While I have herein shown and described for the purpose of illustration the steps through which one specific form of the method may be carried out and one specific embodiment of the machine by which the invention may be practiced, it is to be understood that extensive deviations may be made from the details which are herein set forth for illustrative purposes, all without departing from the spirit of the invention.

I claim:

1. In an electric lap seam resistance welding machine, the combination with an electrode, of means for holding work pieces in overlapped relation to present one side of the lap to the electrode, means to move the work relatively to the electrode, means for so holding the electrode during such movement as to cause frictional sliding contact between the electrode and the side of the lap, means for completing a circuit through the electrode and the overlapping faces of the work pieces to cause a current to flow therethrough, and means for forcing the electrode relatively against the work under sufficient and uniformly maintained pressure to effect a weld between the overlapped faces of the work pieces.

2. In an electric lap seam resistance welding machine, the combination with a pair of opposed electrodes, of means for holding work pieces in overlapped relation to present the opposite faces of the lap between the electrodes, means for forcing the electrodes relatively toward each other and against the lap, means to complete a circuit through the electrodes and the overlapping faces of the lap, means for moving the work relatively to the electrodes, and means for holding the electrodes during such movement to cause sliding frictional contact between the electrodes and the opposite sides of the lap, the opposed electrodes being pressed against the opposite sides of the lap under a pressure sufficient and uniformly maintained to effect a weld between the overlapped faces of the work pieces.

3. In an electric lap seam resistance welding machine, the combination with an electrode, of means for forcing the electrode relatively against the work and with a uniformly maintained pressure, a work carriage, means for clamping the work on the work carriage with the edges of the work pieces in lapped relation to present one side of the lap to the electrode, means for moving the carriage, means for holding the electrode during such movement to cause sliding frictional contact between the electrode and the side of the lap while the opposite faces of the lap are pressed into close contact, and means for completing a circuit through the electrode and the overlapping faces of the work pieces.

4. In an electric lap seam resistance welding machine, the combination with an electrode, of means for holding work pieces in overlapped relation to present one side of the lap to the electrode, means for forcing the electrode relatively against the work and with a uniformly maintained pressure, means for moving the work relatively to the electrode, means for holding the electrode during such movement to cause relative sliding frictional contact between the electrode and the work while the electrode is pressed against the side of the lap, means for completing a circuit through the electrode and the overlapping faces of the work pieces, and means for adjusting the direction of relative movement between the electrode and the work.

5. In an electric lap seam resistance welding machine, the combination with an electrode, of rollers between which the work pieces are held in lapped relation to present one side of the lap to the electrode, means for forcing the electrode relatively against the work and with a uniformly maintained pressure, means for advancing the work between the rollers with relation to the electrode, means for holding the electrode to cause frictional sliding contact between the electrode and the work during such movement, and means for completing a circuit through the electrode and the overlapping faces of the work pieces, the electrode being pressed against the lap under a pressure sufficient to effect a weld.

6. In an electric lap seam resistance welding machine, the combination with opposed electrodes, guide rollers and feed rollers between which the work is adapted to be held in overlapped relation to present opposite faces of the lap between the electrodes, means for forcing the electrodes relatively toward the work and with a uniformly maintained pressure, means for actuating the feed rollers to cause the advance of the work pieces between the electrodes, means for holding the electrodes to cause frictional sliding contact between the electrodes and the opposite faces of the lap while the electrodes are pressed against the lap, the direction of movement imparted by the feed rollers being adjustable, and means for completing a circuit through the electrodes and the overlapping faces of the lap.

7. In an electric lap seam resistance welding machine, the combination with an electrode, of means for forcing the electrode relatively against the work and with a uniformly maintained pressure, a rotatable conductive body against which the work pieces rest in overlapped relation presenting one side of the lap to the electrode, means for moving the work relatively to the electrode, means for holding the electrode during such movement to cause frictional sliding contact between the electrode and the side of the lap while the former is pressed against the lap, and means for completing a circuit through the electrode and the overlapping faces of the lap.

8. In an electric lap seam resistance welding machine, the combination with a pair of electrodes, of means for holding the work pieces in overlapped relation to present the same side of the work to said electrodes with one of the electrodes engaging one side of the lap, means for forcing the electrodes relatively against the work and with a uniformly maintained pressure, means for moving the work relatively to the electrodes, means for holding the lap engaging the electrode during such movement to cause frictional sliding contact between the side of the lap and the lap engaging electrode, and means to complete a circuit through the electrode and the overlapping faces of the lap.

9. In an electric lap seam resistance welding machine, the combination with an electrode, of means for holding work pieces in overlapped relation, means for forcing the electrode relatively toward the work against the side of the lap and with a uniformly maintained pressure, means for moving the work relatively to the electrode, means for holding the electrode during such movement to cause sliding frictional contact between the electrode and the work while the latter is pressed against the side of the lap, a clearing tool engaging the surface of the work in advance of the electrode, and means to complete a circuit through the electrode and the overlapping faces of the lap.

10. The method of electric lap seam resistance welding, which consists in holding the work pieces in overlapping relation, presenting one side of the lap to an electrode, moving the work relatively to the electrode, so holding the electrode as to cause frictional sliding contact to take place between the work and the electrode, causing a current to flow through the electrode and the overlapping faces of the lap, and forcing the electrode relatively against the work under sufficient and uniformly maintained pressure during such movement and during the maintenance of said current to effect a weld between the faces of the lap.

11. The method of electric lap seam resistance welding, which consists in holding the work pieces in overlapped relation, presenting one lapped side to one of a pair of electrodes, forcing the lap engaging electrode relatively against the work under sufficient and uniformly maintained pressure to effect a weld, applying the companion electrode to the work to cause a heating current to flow through the overlapping faces of the work pieces to be joined, moving the work relatively to the electrodes, and so holding the lap engaging electrode as to cause frictional sliding contact to take place between the work and the lap engaging electrode.

12. The method of electric lap seam resistance welding, which consists in holding the work pieces in overlapped relation, presenting the same side of the work to a pair of electrodes with one of the electrodes engaging one side of the lap, forcing the electrodes against the work under a uniformly maintained pressure, moving the work relatively to the electrodes, so holding the lap engaging electrode during such movement as to cause frictional sliding contact between the work and the lap engaging electrode, and causing a heating current to flow through the overlapping faces of the parts to be joined during such movement and during such sliding contact.

13. The method of electric lap seam resistance welding, which consists in holding the work pieces in overlapped relation, applying one side of the lap to a conductive body, applying an electrode against the opposite side of the lap, moving the work relatively to said electrode, so holding the electrode during such movement as to cause frictional sliding contact between the side of the lap and the electrode, causing a heating current to flow through the electrode and the overlapping faces of said lap, and forcing the electrode against the lap under a sufficient and uniformly maintained pressure during such movement and during the maintenance of such current as to effect a weld between the overlapped faces of the work pieces.

14. The method of electric lap seam resistance welding, which consists in holding the work pieces in overlapping relation, presenting the work between opposed electrodes with the latter engaging opposite sides of the lap, forcing the lap engaging electrodes against the opposite sides of the lap under a pressure sufficient and uniformly maintained to effect a weld, causing a heating current to flow from one electrode to the other through the overlapping faces of said lap, moving the work relatively to said electrodes, and so holding the electrodes during such movement and during the maintenance of such current as to cause frictional sliding contact between the work and the electrodes.

15. The method of electric lap seam resistance welding, which consists in holding work pieces in fixed relation to each other and with their edges in overlapping relation, presenting the work between opposed electrodes with the latter engaging opposite sides of the lap, forcing the electrodes against the opposite sides of the lap under a sufficient and uniformly maintained pressure to effect a weld, traversing the work past the electrodes, so holding the electrodes as to cause frictional sliding contact between the latter and the opposite sides of the overlapping edges, and causing a heating current to flow from one electrode to the other through the overlapping faces of the lap during such movement and during such frictional sliding contact.

16. The method of electric lap seam resistance welding, which consists in holding work pieces in overlapping relation, presenting one side of the lap to an electrode, forcing the electrode against the lap under a uniformly maintained pressure, moving the work relatively to the electrode, so holding the electrode as to cause frictional sliding contact to take place between the work and the electrode, causing a heating current to flow through the electrode and the overlapped faces of the work pieces, and clearing a path to be slidingly engaged by the electrode along the surface of the work in advance of the electrode.

17. A machine according to claim 9, in which the clearing tool is mounted adjacent to and movable with the electrode to be pressed against the work simultaneously therewith and to a degree corresponding with the operative positioning of the electrode.

18. A machine according to claim 9, in which the clearing tool is mounted adjacent to and movable with the electrode to be pressed against the work simultaneously therewith and to a degree corresponding with the operative positioning of the electrode and in which the clearing tool is backed-up or supported by the electrode during the clearing operation.

19. A machine according to claim 9, in which the clearing tool is mounted adjacent to and movable with the electrode to be pressed against the work simultaneously therewith and to a degree corresponding with the operative positioning of the electrode, and in which the clearing tool is backed-up or supported by the electrode during the clearing operation, said machine having intervening insulation between the clearing tool and the backing-up electrode.

20. A machine according to claim 1, in which the electrode is inclined from the work pieces toward its point of support in the opposite direction to that in which the material is advanced, substantially as described.

21. A machine according to claim 9, in which the clearing tool is mounted adjacent to and movable with the electrode to be pressed against the work simultaneously therewith and to a degree corresponding with the operative positioning of the electrode, and in which the electrode is inclined from the work pieces toward its point of support in the opposite direction to that in which the material is advanced, substantially as described.

22. The method defined in claim 16, in which the step of clearing the surface in advance of the electrode is initiated as the electrode and work are being operatively engaged with one another and continued during relative movement of the work and electrode in such operative engagement, and to a degree corresponding with the relative position of the work and electrode in their operative engagement.

23. In an electric lap seam resistance welding machine, the combination with an electrode, of means for holding work pieces in overlapping relation, means for forcing the electrode relatively toward the work and against the side of the lap, means for moving the work relatively to the electrode, a clearing tool mounted in advance of the electrode and adjacent to and movable with the same to be pressed against the work simultaneously therewith and to a degree corresponding with the operative positioning of the electrode, and means to complete a circuit through the electrode and the overlapping faces of the lap; whereby clearing of a path to be traversed by the electrode is automatically initiated as the electrode and work are being operatively engaged with one another and automatically continued during relative movement of the work and electrode in such operative engagement, and to a degree automatically corresponding with the relative position of the work and electrode in their operative engagement.

GEORGE A. CUTTER.